US006721792B2

(12) United States Patent
Erickson et al.

(10) Patent No.: US 6,721,792 B2
(45) Date of Patent: *Apr. 13, 2004

(54) METHOD AND SYSTEM FOR PROVIDING A PERSISTENT HTTP TUNNEL

(76) Inventors: Rodger D. Erickson, 3871 Utah Pl., St. Louis, MO (US) 63116; Ronald D. Sanders, 7921 N. Jensen Rd., Spokane, WA (US) 99217

( * ) Notice: Subject to any disclaimer, the term of this patent is extended or adjusted under 35 U.S.C. 154(b) by 67 days.

This patent is subject to a terminal disclaimer.

(21) Appl. No.: 10/175,245

(22) Filed: Jun. 18, 2002

(65) Prior Publication Data

US 2002/0156901 A1 Oct. 24, 2002

Related U.S. Application Data

(63) Continuation of application No. 09/268,068, filed on Mar. 15, 1999, now Pat. No. 6,412,009.

(51) Int. Cl.[7] .............................................. G06F 13/00
(52) U.S. Cl. ...................... 709/227; 709/219; 709/236; 709/245
(58) Field of Search ................................ 709/217, 219, 709/227, 228, 229, 230, 236, 245, 313, 246, 329

(56) References Cited

U.S. PATENT DOCUMENTS

| 5,754,830 | A | | 5/1998 | Butts et al. |
| 5,778,372 | A | | 7/1998 | Cordell et al. |
| 5,805,803 | A | * | 9/1998 | Birrell et al. ................ 713/201 |
| 5,935,212 | A | | 8/1999 | Kalajan et al. |
| 5,941,988 | A | | 8/1999 | Bhagwat et al. |
| 6,096,096 | A | * | 8/2000 | Murphy et al. ................ 717/11 |
| 6,269,403 | B1 | * | 7/2001 | Anders ........................ 709/231 |
| 6,295,551 | B1 | * | 9/2001 | Roberts et al. ............. 709/205 |

FOREIGN PATENT DOCUMENTS

CN 273061 3/1996

OTHER PUBLICATIONS

Provan, D., "Tunneling IPX Traffic Through IP Networks," Novell, Inc., Jun. 1991.
Woodburn, R., and D. Mills, "A Scheme for an Internet Encapsulation Protocol: Version 1," University of Delaware, Jul. 1991.

* cited by examiner

Primary Examiner—Viet D. Vu (57) ABSTRACT

A method and system for providing a persistent HTTP tunnel for a connection-oriented protocol between a client and a Web server. A data message complying with the connection-oriented protocol is generated and embedded into a chunked data message in compliance with a chunking option for the HTTP. The chunked data message is transmitted between a client and a Web server. Upon receiving any chunked data message at the Web server, the Web server parses the chunked data message and delivers the data message to a host system. Upon receiving any chunked data message at the client, the client parses the chunked data message and delivers the data message to a terminal emulator running on the client. This allows a terminal session to be supported by a real-time bi-directional persistent connection with the host system. The bi-directional persistent connection allows interleaving of the chunked data messages from the Web client with the chunked data messages on the Web server on the persistent HTTP tunnel.

8 Claims, 5 Drawing Sheets

POST
201 [Request-URI]
202 [HTTP-Version]
204 Transfer-encoding: chunked
206 Accept: [application/octet-stream]
208 User-Agent: [WdWsock]
210 Host: [Web Server Name]
212 Connection: Keep-Alive

222 [HTTP-Version]
224 [Status-Code]
226 [Reason-Phrase]
228 Connection: Keep-Alive
230 Transfer-encoding: chunked
232 Content Type: application/octet-stream

252 — [ASCII Representation of Hex Length of the Chunk]
254 — [End of Chunk Header Indicator]
256 — [Keep-alive Data]
258 — [Telnet Msg]
260 — [End of Chunk Indicator]

*Fig.7.*

PRIOR ART

METHOD AND SYSTEM FOR PROVIDING A PERSISTENT HTTP TUNNEL

CROSS-REFERENCE TO RELATED APPLICATION

This application is a continuation application of U.S. Ser. No. 09/268,068 now U.S. Pat. No. 6,412,009 B1, filed on Mar. 15, 1999, entitled METHOD AND SYSTEM FOR PROVIDING A PERSISTENT HTTP TUNNEL. Priority of the filing date of said co-pending application, the subject matter of which is specifically incorporated by reference, is claimed under 35 U.S.C. §120.

FIELD OF THE INVENTION

The present invention relates generally to communications between two computers, and, more particularly, to a communication method and system that provides a persistent HTTP tunnel for a connection-oriented protocol between the two computers.

BACKGROUND OF THE INVENTION

Figure 1:
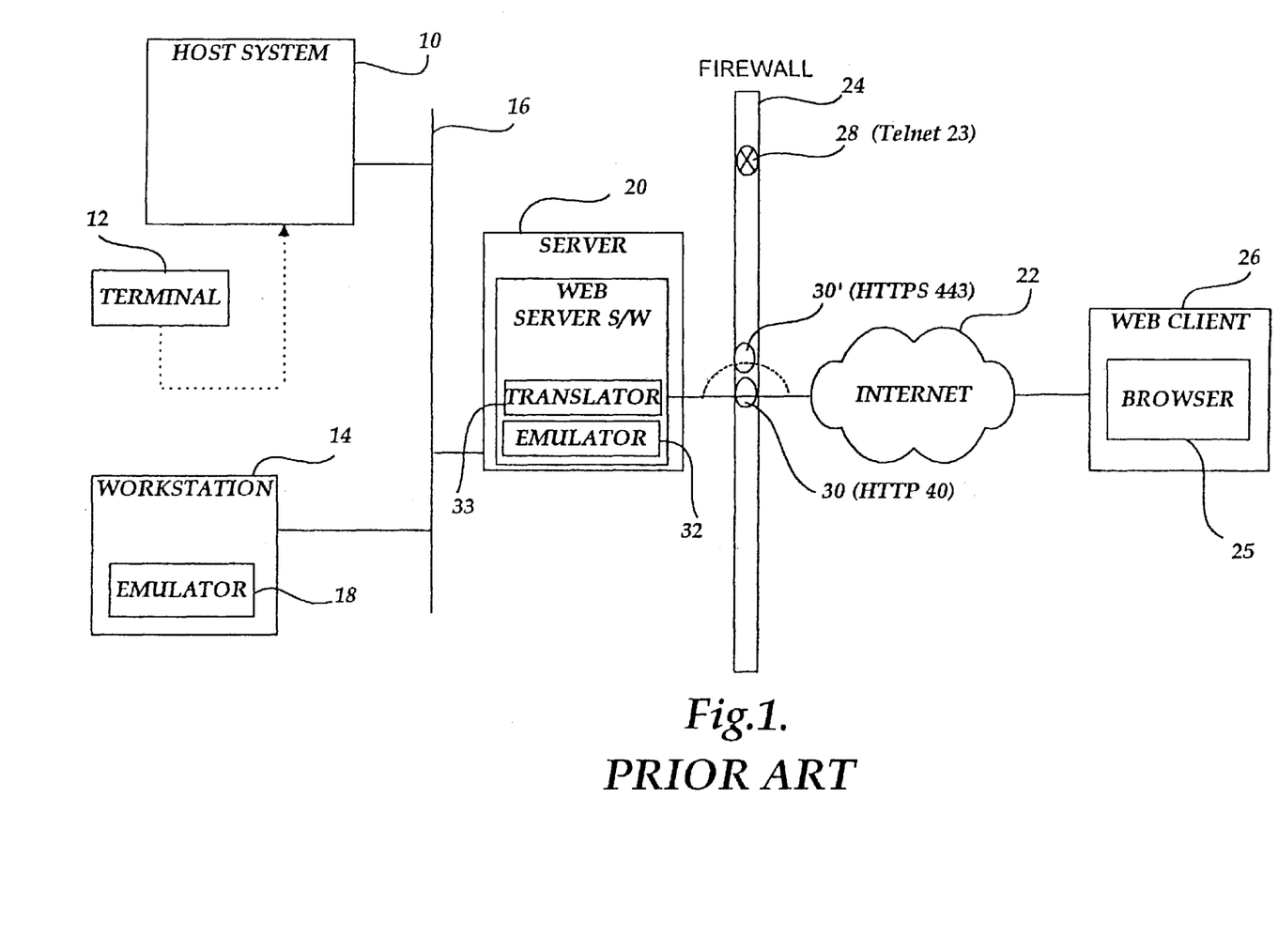
FIG. 1 is a block diagram of a prior art method for connecting Web clients to host computer systems.

Many corporations continue to maintain their corporate computer data on what are referred to as "legacy host" systems. These systems are generally older mainframe or mini-computers that cannot be easily replaced. As personal computers become more commonplace, a significant effort has been devoted to methods by which a user of a personal computer can access data stored on a legacy host. One such system is shown in FIG. 1, whereby access to a host system 10 may be through a terminal 12 directly coupled to the host system 10 that provides a local login capability. If a workstation 14 desires to connect to the host system 10 over a Local Area Network (LAN) 16, the workstation 14 runs a terminal emulator 18. A Telnet protocol is used between the host system 10 and the workstation 14 to provide the workstation 14 access to the host system 10 as if the workstation was a local terminal directly connected to the host system.

With the phenomenal growth of the Internet, a need developed to provide the ability of a user to access a host computer from anywhere in the world. A typical configuration to allow such Internet access includes a Web server 20 coupled to the host system 10 via the LAN 16. The Web server 20 is then coupled to the Internet 22 through a firewall 24. The firewall 24 enforces a security policy between a secure internal network containing the host system 10 and an untrusted network such as the Internet. The firewall may be a personal computer (PC), a router, a mainframe, a UNIX workstation, or any combination of such devices responsible for enforcing the security policy. A Web client computer 26 runs a browser program 25 to access the Web server 20 through the Internet 22.

Because the Internet 22 is an unsecured network, most firewall security policies will not allow the Web client 26 to communicate using the well known "Telnet port 23," shown at 28. However, most firewalls allow communications through the well known "HyperText Transfer Protocol (HTTP) port 80," shown at 30, and the secure "HTTP port 443," shown at 30'. Therefore, a current system that provides a local login experience to a Web client 26 uses one of these HTTP ports 30 30'. In this system, the Web server 20 runs a terminal emulator 32 that provides a Telnet session with the host system 10. The Web server 20 receives the Telnet data from the host system 10 and instead of displaying the data as a typical text screen will instead send the Telnet data to a translator 33. The translator 33 translates the Telnet data to HyperText Markup Language (HTML) statements that are sent to the browser program 25 running on the Web client 26. The browser 25 then translates the HTML statements and displays an HTML page on the Web client.

A problem with this type of system is that the translated HTML screen does not look sufficiently similar to a local login screen that the user would see if they were directly connected to the host system and the interaction with the HTML screen is not sufficiently similar to the interaction with the directly connected terminal. In certain situations, the differences may require additional training of the users on the Web client. Another problem is that the response times between a user request on the Web client 26 and the return response from the host system is more variable in comparison with a local login response time. For example, response times may range from a second to thirty seconds using the HTML screen, in comparison with response times in the range of one second to three seconds with a directly connected terminal. The variable response times are due to the nature of the HTTP protocol.

HTTP is a request/response protocol. The Web client 26, using the browser 25, establishes a connection with the Web server 20 and sends a request to the Web server. After the Web server sends a response to the browser 25, the connection is closed. Before additional requests may be handled, a new connection must be established. Even though the newer HTTP 1.1 specification provides a keep-alive mechanism that allows one connection for multiple objects on an HTML page, the connection is closed either by the Web server or the browser after a period of inactivity. The period of inactivity may range from several seconds to a fraction of a second depending on the activity on the Web server. Many protocols, including Telnet, have insufficient transaction rates to maintain an alive connection even when the Web server is only modestly loaded. Closing the connection and establishing a new connection creates significant overhead resulting in decreased performance.

Given the shortcomings associated with the prior art method of providing access to host computer systems for Web clients, there is a need for a method that uses existing standard ports in the firewall while providing more consistent response times similar to the response times of a workstation connected through a LAN to a host system. The present invention is directed to filling this need.

SUMMARY OF THE INVENTION

In accordance with this invention, a server, a client, and a method of operation are provided for a Web client to access a host system with performance and displays comparable to the performance and displays of a workstation connected through a LAN to the host system.

In accordance with one aspect of this invention, a method of providing a persistent HTTP tunnel for a persistent virtual session is provided. A data message complying with a connection-oriented protocol is generated at an endpoint of a connection-oriented virtual session. The data message is embedded into a chunked data message complying with a chunking option of an HTTP specification. The chunked data message is transmitted between a Web client and a Web server via an HTTP connection. Upon receiving any chunked data message at the Web server, the Web server parses the chunked data message and delivers the data message to one endpoint of the connection-oriented virtual session. In the other direction, upon receiving any chunked data message at the Web client, the Web client parses the chunked data message and delivers the data message to another endpoint of the connection-oriented virtual session. The chunked data messages from the Web client are interleaved with the chunked data messages from the Web server on the persistent HTTP tunnel.

In accordance with other aspects of this invention, the connection-oriented protocol is a Telnet protocol.

In accordance with still further aspects of this invention, one endpoint of the connection-oriented virtual session is a host system.

In accordance with yet further aspects of this invention, the other endpoint of the connection-oriented session is a Web client application.

In accordance with still other aspects of this invention, the Web client application is a terminal emulator.

In accordance with another aspect of this invention, a method for creating a persistent tunnel between a Web client and a Web server using an HTTP protocol for providing a persistent virtual connection between a host system and the Web client is provided. A connection between the Web client and the Web server is established using a chunking option in accordance with an HTTP protocol that allows a series of messages to be sent as chunked messages. A virtual session is established between the host system and the Web client through a Web Server extension. A plurality of host messages are transmitted from the host system to the Web server extension and inserted into a chunked host message at the Web server. The Web server forwards the chunked host messages to the Web client over the connection. The Web client parses the chunked host message and delivers the host message to an application. In the other direction, a plurality of Web client messages is transmitted from the application to a tunneling mechanism on the Web client. The tunneling mechanism inserts the client message into a chunked client message and forwards the chunked client message to the Web server over the connection. The Web server forwards the chunked client message to an extension before receiving subsequent chunked client messages. The extension parses the chunked client message and delivers the client message to the host system. The chunked data messages from the Web client are interleaved with the chunked data messages from the Web server on the persistent HTTP tunnel.

In accordance with a further aspect of the present invention, a server for providing a persistent virtual session over HTTP is provided. The server includes a server software component operable to communicate via a persistent HTTP tunnel with a first endpoint of a connection-oriented session. The server also includes an extension operable to communicate with the server software component and a second endpoint of a connection-oriented session. Upon a connect request from a client, the extension establishes a connection-oriented session with the second endpoint to provide a virtual connection-oriented session between the first endpoint and the second endpoint. After the virtual connection-oriented session is established, the extension receives one or more chunked client messages from the client. The chunked messages comply with a chunking option as specified in the HyperText Transfer Protocol. Each chunked client message includes a chunk header and a data portion. The extension forwards the data portion to the second endpoint over the connection-oriented session. The extension also receives one or more second endpoint messages from the second endpoint and encapsulates each second endpoint message into a chunked second endpoint message. The extension then forwards the chunked second endpoint message to the client that delivers the second endpoint message of the chunked second endpoint message to the first endpoint.

In accordance with other aspects of this invention, the second endpoint is a host system.

In accordance with still further aspects of this invention, the first endpoint is a client application.

In accordance with yet still further aspects of this invention, the client application is a terminal emulator.

In accordance with a further aspect of this invention, a client having a first endpoint of a connection-oriented session having a persistent virtual session with a second endpoint over HTTP is provided. The client includes an application for sending and receiving data messages complying with the connection-oriented session at the second endpoint and an HTTP tunnel mechanism. The HTTP tunnel mechanism receives the data messages generated by the application and inserts the data messages into a chunked data message complying with HTTP and transmits the chunked data messages to a Web server. The HTTP tunnel mechanism also receives chunked data messages generated by the Web server and forwards the data messages within the chunked data message to the application.

A technical advantage of the present invention is the ability to establish a connection-oriented virtual session between a host system and a Web client through the commonly available HTTP port. Both the Web server and the Web client encapsulate the connection-oriented session data, such as Telnet, into chunks that comply with the HTTP specification. The Web server transmits the HTTP response as soon as the request is received and transmits chunked messages and receives chunked messages from the Web client in an interleaving manner without completing the original request. Because the chunks are interleaved, the present invention provides a persistent bi-directional virtual connection between the host system and the Web client.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

In accordance with the present invention, access to host systems from Web clients is available in a manner that provides performance and displays comparable to the performance and displays of a workstation connected through a LAN to the host system. The present invention provides a system and method for providing a persistent HTTP tunnel for any connection-oriented protocol and keeping the HTTP tunnel connection between the Web client and the Web server persistent for the duration of the communication between the Web client and host system. By providing a persistent connection for the entire duration, the present invention achieves performance comparable to the performance of the workstation 14 connected through the LAN 16 to the host system, as shown in FIG. 1. In addition, the present invention utilizes an existing port in the firewall rather than requiring a new hole in the firewall.

Although the presently preferred embodiment of the invention utilizes the connection-oriented protocol Telnet, those skilled in the art will recognize that other connection-oriented protocols may be used. As mentioned earlier, the Telnet protocol is typically used between a host system and a client residing on a network to provide the client access to the host system as if the client was a local terminal directly connected to the host system.

Figure 2:
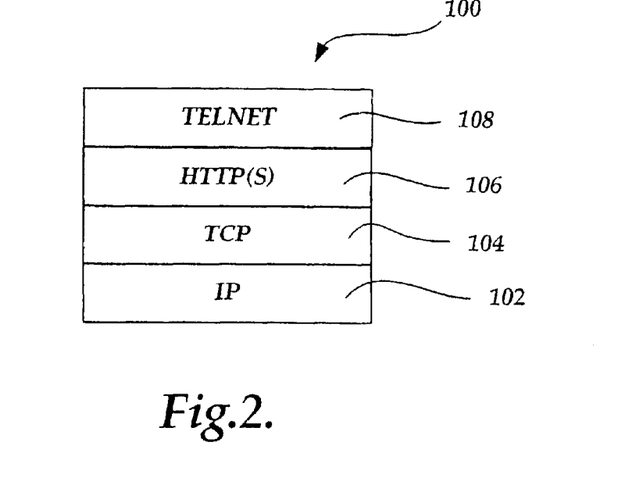
FIG. 2 is a block diagram of a protocol stack for tunneling Telnet data on HTTP.

FIG. 2 is a block diagram illustrating how Telnet data is tunneled through HTTP in accordance with the present invention. A protocol stack 100 of the present invention has a first or lower layer 102 that represents an Internet layer or a network layer that shields higher layers 104–108 from a physical network architecture. An Internet Protocol (IP) is the protocol of the first layer 102 and is a connectionless protocol that does not provide reliability, flow control or error recovery. The IP provides a routing function that ensures that messages will be correctly delivered to their destination. A second layer 104 is a transport layer that provides an end-to-end reliable data transfer. The second layer 104 allows multiple applications to be supported simultaneously. A Transmission Control Protocol (TCP) is used in the second layer 104 to provide a reliable exchange of information. A third layer 106 is an application layer. An interface between the application layer and the transport layer is defined by port numbers and sockets. In contrast to prior art methods of implementing Telnet on top of TCP, the present invention tunnels Telnet on top of the HTTP(S) protocol of the third layer 106 resulting in a fourth layer 108 of the protocol stack 100. One skilled in the art will appreciate that HTTP is considered the "official" application protocol of the World Wide Web and Telnet is considered the "official" protocol for emulating a remote terminal. The tunneling of the Telnet protocol on top of the HTTP protocol will be described in greater detail below.

Figure 3:
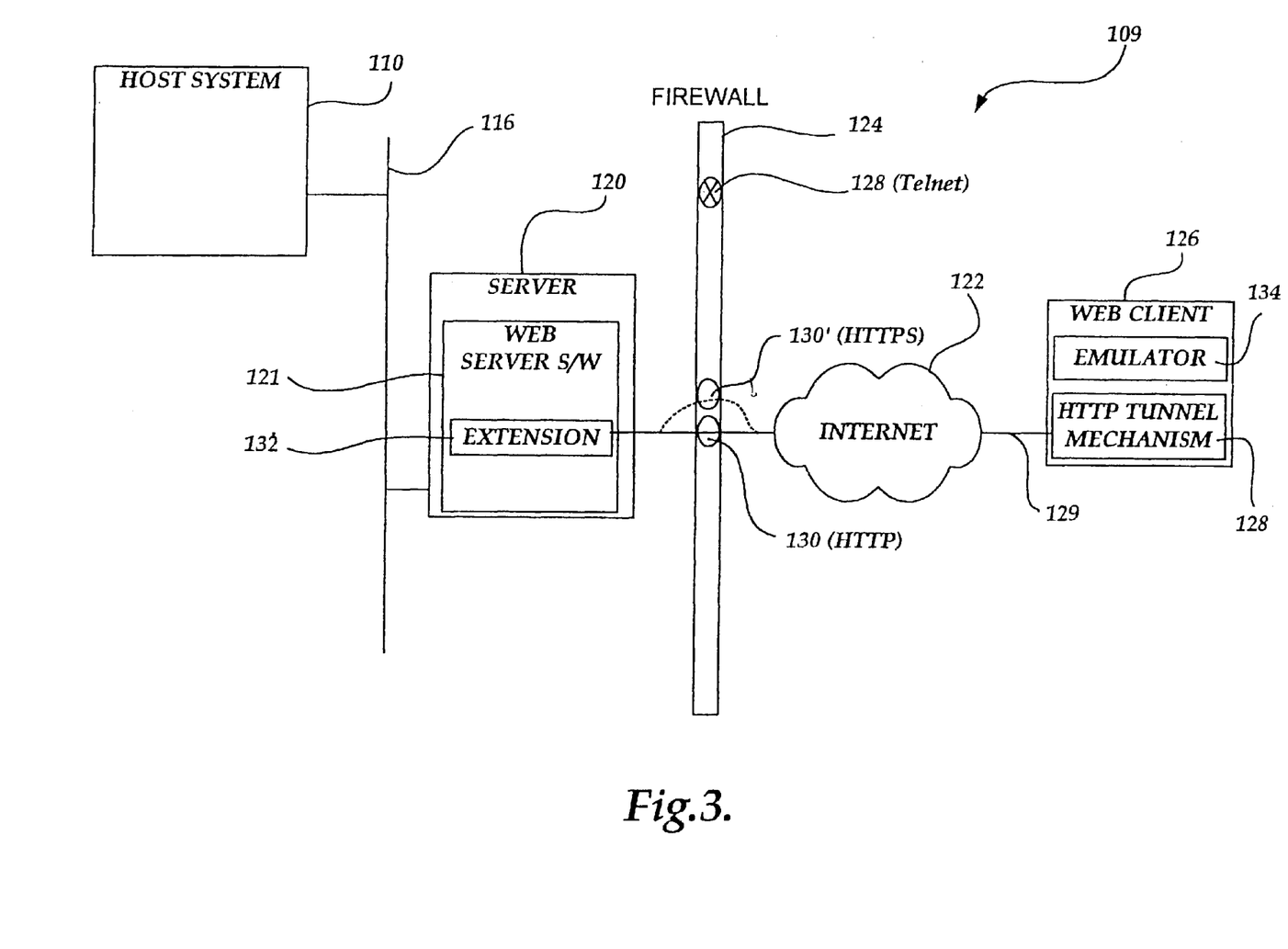
FIG. 3 is a block diagram of a system for connecting Web clients to host systems in accordance with the present invention.

FIG. 3 is a block diagram of a system for connecting Web clients to host systems in accordance with the present invention. A system 109 includes a Web server 120 coupled to a host system 110 via a LAN 116. The Web server 120 is also coupled to an Internet 122 through a firewall 124. The firewall 124 enforces a security policy between a secure internal network containing the host system 110 and an untrusted network such as the Internet. The firewall 124 may be a personal computer (PC), a router, a mainframe, a UNIX workstation, or any combination of such devices responsible for enforcing the security policy.

A Web client 126 is coupled to the Web server 120 through the Internet 122. The system 109 further comprises an extension 132 residing on the Web server 120. The extension 132 may run in the same process space as Web server software 121 or communicate with the Web server software 121 using an interprocess communication well known in the art. The Web server software 121 passes all commands and data designating the extension 132 to the extension 132. The commands and data are received from the Web client through a HyperText Transfer Protocol (HTTP) port 80, shown at 130, or the secure HTTP port 443, shown at 130' in the firewall 124. As one skilled in the art will appreciate, the firewall 124 passes the commands and data from the Web client onto the Web server 120. Because the present invention utilizes the standard HTTP ports 130 and 130', additional holes in the firewall are not necessary. In addition, because the present invention utilizes the standard HTTP ports, the present invention minimizes the amount of development necessary to create a secure Web server environment. Rather, the present invention can utilize existing resources residing on the Web server, thereby leveraging their development costs. The extension 132 is responsible for providing a virtual session between the host system 110 and the Web client 126.

The Web client 126 comprises an HTTP tunnel mechanism 128 and an emulator 134. The HTTP tunnel mechanism 128 is a software module that provides an Application Programming Interface (API) for TCP, such as Winsock created by Microsoft Corporation, of Redmond, Wash., or WDWSock created by Wall Data Incorporated, of Kirkland, Wash. The HTTP tunnel mechanism 128 receives messages created in the extension 132, parses the messages, and passes any Telnet data or commands to the emulator 134 so that the emulator 134 can emulate a host terminal.

The present invention utilizes a chunking option as specified in the HyperText Transfer Protocol specification 1.1 dated January 1997, referred to as HTTP/1.1 (RFC 2068), the specification of which is hereby incorporated by reference. The chunking option refers to a new transfer coding implementation that allows a body of a message to be transferred as a series of chunks, "chunked data," each with its own size indicator, followed by an optional footer containing entity-header fields. Prior to the chunking option, the size of the message along with the entire message must be sent at the same time. The present invention expands the use of the chunking option by sending a series of HTTP messages with embedded session-oriented data, "chunked messages," between the Web server and the Web client without sending an end chunk message. This allows one connection to remain active during the series of interleaved HTTP messages between the Web server and the Web client, thereby creating an HTTP tunnel 129 that is persistent for the duration of the communication between the host system and the Web client. The interleaved HTTP messages include messages that alternate between the Web client and the Web server as the sender for each message or messages that alternate between one or more Web client messages and then one or more Web server messages. Therefore, a persistent virtual connection between two endpoints of the connection-oriented protocol is provided. One endpoint located on the host system and the other endpoint on the Web client. In the embodiment described, a terminal emulator is the endpoint on the Web client and a Telnet process is the endpoint on the host system.

Depending upon the type of Web server 120, a setting may need to be changed to inform the Web server 120 not to process chunked data designating the extension 132. By changing the setting, the extension is allowed to handle the chunked data in a manner described in detail below. To change the setting of any Web server 120 running Microsoft Internet Information Server (IIS) 4.0 by Microsoft Corporation, the extension 132 accesses a metabase and programmatically changes an MD_UPLOAD_READAHEAD_SIZE parameter to zero (0) for the named extension 132. The MD_UPLOAD_READAHEAD_SIZE parameter is typically used to fine tune memory usage on the Web server 120. Typically, the MD_UPLOAD_READAHEAD_SIZE parameter is set to a value that is an average size of a request message received from a Web client 126. The present invention therefore modifies the MD_UPLOAD_READAHEAD_SIZE parameter for an unusual purpose of having the Web server software 121 ignore processing of chunked data that is designated to be passed to the extension 132. By disabling the processing of chunked data in the Web server software 121, the extension 132 can provide the processing for the chunked data, thereby allowing a connection-oriented protocol to be tunneled on top of HTTP and creating a bi-directional connection that remains active for the duration of the communication between a Web client and a host system.

Figure 4:
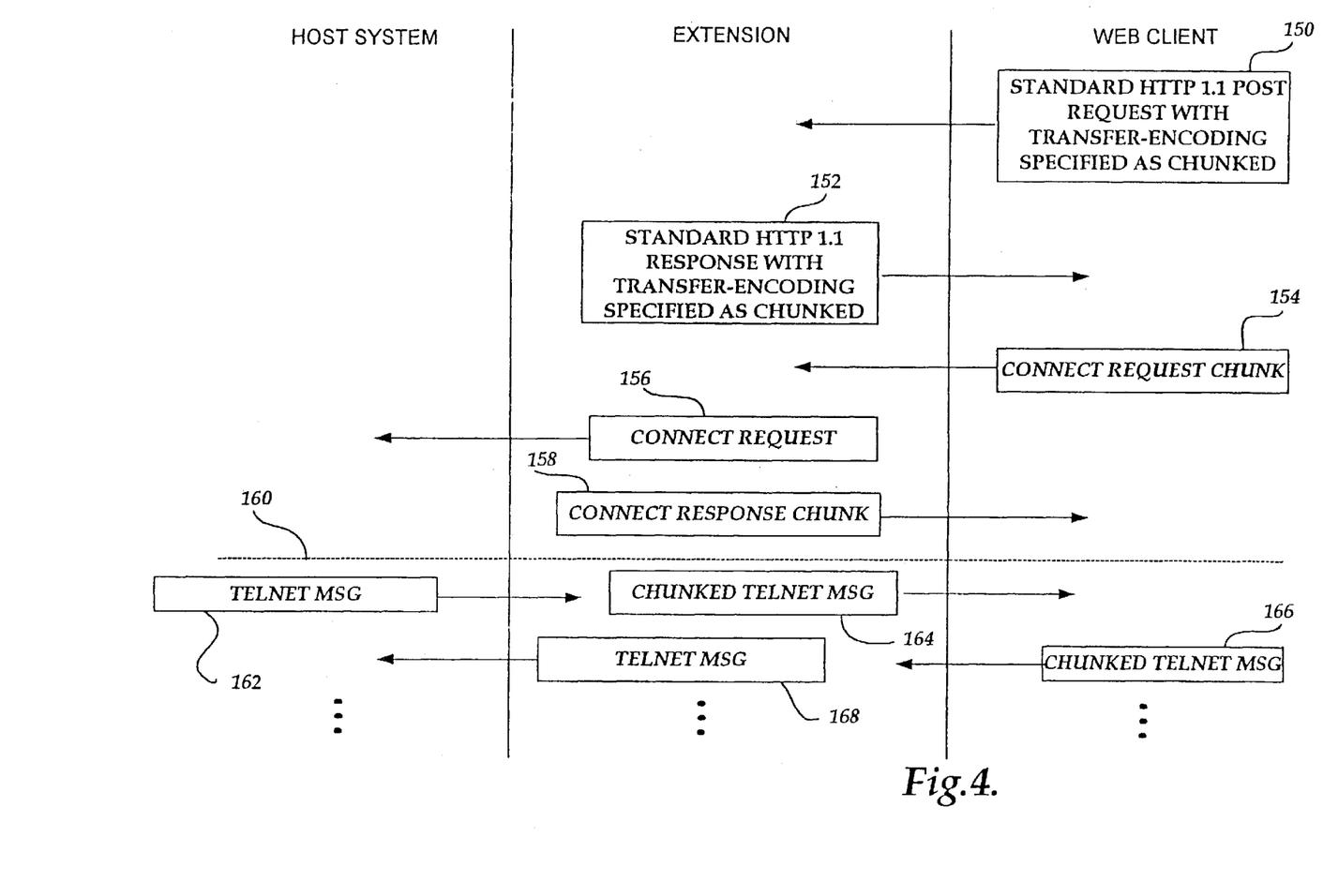
FIG. 4 is a block diagram illustrating a communication flow among a Web client, an extension residing on a Web server, and a host system in accordance with the present invention.

FIG. 4 is a block diagram illustrating the communication flow among the Web client 126, the extension 132, and the host system 110. Again, Telnet is used as the connection-oriented protocol and is given by way of nonlimiting example only. At block 150, the Web client 126 generates a standard HTTP/1.1 post request with transfer-encoding specified as chunked. The creation of the post request will be described in greater detail below. At block 152, the extension receives the post request, and generates a standard HTTP/1.1 response with transfer-encoding specified as chunked which is sent back to the Web client. At block 154, the Web client generates and sends a connect request chunk to the extension. The connection request chunk includes a destination port field for specifying the port number of the host system for connection. In the above-described embodiment, the destination port field contains a value specifying the Telnet port 23. The connect request chunk also includes a destination IP address field for specifying the IP address for the host system. Because the connect request chunk occurs after the initial post response, the connect request chunk uses the format for chunked data. At block 156, the extension sends a connect request to the host system to establish a Telnet session. At block 158, the extension generates and sends a connect response chunk to the Web client. After the Web client receives the connect response chunk, the end-to-end session between the Web client and the host system via the extension is active.

The communication flow occurring after the reference line 160 represents Telnet data tunneled over HTTP. A typical exchange has the host system starting Telnet negotiation. At block 162, the host system generates a Telnet message. The Telnet message includes Telnet commands and/or Telnet data and is sent to the extension. At block 164, the extension encapsulates the Telnet message into a chunked Telnet message by embedding the Telnet message in a chunk that complies with the HTTP/1.1 format with Transfer-Encoding specified as chunked. The chunked Telnet message is sent via the HTTP tunnel 129 through the HTTP port over the Internet to the Web client.

The HTTP tunnel mechanism 128 in the Web client 126 parses the chunked Telnet message and provides the emulator 134 the original Telnet message as sent from the host system. Whenever the emulator generates a Telnet message, the HTTP tunnel mechanism 128 creates a chunked Telnet message at block 166 and forwards the chunked Telnet message through the Internet to the Web server software that in turn passes the chunked Telnet message to the extension 132. The extension unchunks the chunked Telnet message and forwards to the host system only the Telnet message as originally sent by the emulator to the HTTP tunnel mechanism, at block 168. As indicated, the sending of Telnet messages and the chunking of the Telnet message into a chunked Telnet message continues without having a new connection established between the Web client and the Web server. Because only one connection is needed during the communication flow, the present invention provides performance comparable to workstations connected through a LAN to a host system (shown in FIG. 1) and responses that are less variable than response times of prior art methods using translated HTML statements.

One aspect of the present invention is enabling the Web server software 121 to pass the chunked messages through to the extension without waiting for additional chunked messages prior to delivery to the extension 132. This allows the present invention to tunnel Telnet messages on top of the HTTP protocol using the standard HTTP ports 130, 130' and to use the HTTP ports 130, 130' as a bi-directional connection for a virtual session between the host system and the Web client.

Figure 5:
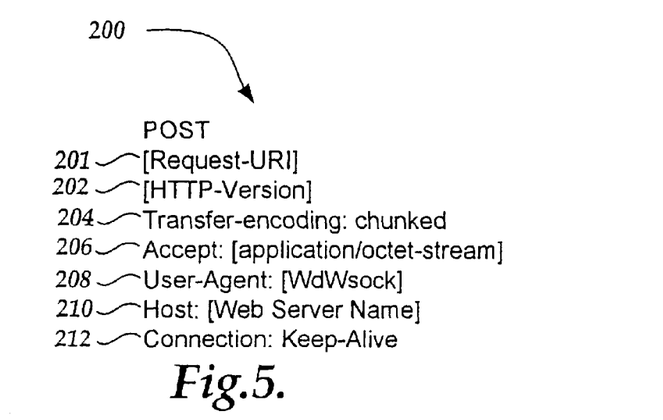
FIG. 5 is a format for an HTTP Post request suitable for use in the present invention.
Figure 6:
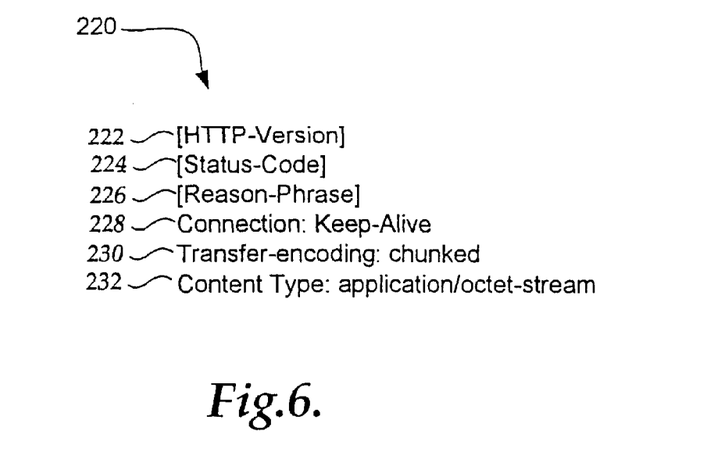
FIG. 6 is a format for an HTTP response message to the HTTP Post request of FIG. 5 suitable for use in the present invention.
Figure 7:
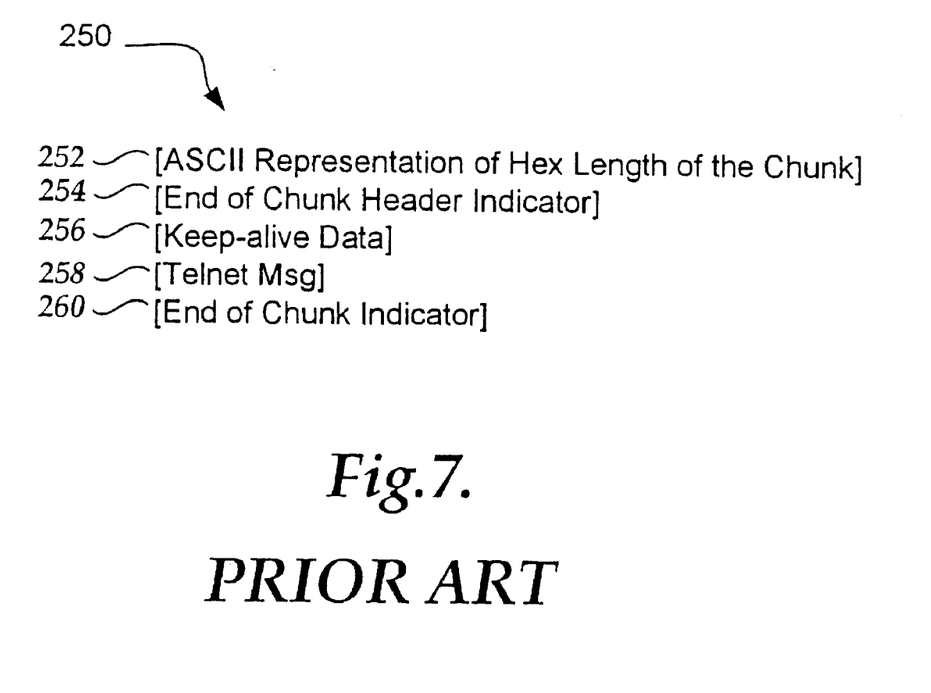
FIG. 7 is a format of an HTTP chunk message suitable for use in the present invention.

FIGS. 5–7 illustrate formats for the communication flows of FIG. 4 in more detail. First, FIG. 5 illustrates a standard HTTP/1.1 post request format suitable for use in the present invention. The format of the post request is as specified in the HyperText Transfer Protocol HTTP/1.1 specification. The present invention is concerned with the contents of the post request rather than the format of the post request. At line 201, a request-URI field contains a name for the extension 132 in the Web server. The name in the request-URI field may include a dynamic link library (DLL) or other name of a component depending on the operating system platform. At line 202, an HTTP-version field must specify version 1.1 or greater. Only version 1.1 or greater allows a transfer-encoding to be chunked as is necessary for the present embodiment of the invention. On line 204, the transfer-encoding is designated as chunked.

As illustrated in FIG. 4, at blocks 154, 158, 164, chunking allows the Web client and the host system to exchange a series of messages without having to open a new connection. At line 206 of FIG. 5, in the present embodiment, the Web server is requested to accept application/octet-stream data. This is not necessary for the purposes of the present invention but is typical for Web servers to expect binary data. At line 208, in the User Agent field, an identifier for the HTTP tunnel mechanism is provided. The identifier is shown as a non-limiting example and is not necessary to practice the present invention. At line 210, in the Host field, the name of the Web server is specified. At line 212, in the Connection field, Keep-Alive is specified so that the connection remains active. However, even with Keep-Alive specified, the connection may be terminated by either the Web client or the Web server after even very brief periods of idleness. In order to achieve a true Keep-Alive connection, the present invention incorporates additional Keep-Alive data in the tunneled data as will be described in greater detail with reference to FIG. 7.

FIG. 6 illustrates a format for a standard HTTP/1.1 response. Again, the format of the data is as specified in the HTTP/1.1 specification and the present invention is only concerned with the content of the fields. Lines 222, 224, and 226 are generated by the Web server in response to the post request (FIG. 5) that was received and are explained in the HTTP/1.1 specification. Lines 228, 230, and 232 are generated by the extension before the response is sent to the Web client. At line 228, the connection is specified as Keep-Alive as described earlier. Transfer encoding is specified as chunked and the Web server indicates the format of response data as application/octet-stream (i.e., binary data rather than text or other special format data).

FIG. 7 illustrates a format for a chunk suitable for use in the present invention. At line 252, the first field specifies an ASCII representation of the hex length of the chunk. According to the HTTP 1.1 specification, by allowing each chunk to specify the hex length of the chunk, multiple chunks (messages) may be sent for one HTTP request. However, the last message must provide a unique identifier to indicate when the HTTP request is complete. Typically, the Web server software waits until all the chunks for one message body are received before generating a response. However, because the present invention uses the chunking option in a new manner and does not send a last message, the present invention prevents the Web server software from buffering the chunked messages and instead forces the Web server software to send the chunked messages to the extension as the chunked messages are received. This allows the present invention to provide bi-directional communication without waiting for an entire message and without establishing more than one connection. At line 254, an end of chunk header indicator is chosen according to the HTTP/1.1 specification. Lines 256 and 258 provide the tunneling aspect of the present invention. First, line 256 provides a data field that may be sent in all chunked packets to keep the connection alive. This Keep-Alive field is necessary because some Web servers will close a connection if additional chunks are not received within a certain time frame. Therefore, in the present invention, the HTTP tunnel mechanism that is running on the Web client generates a chunk with only the Keep-Alive data field and without any additional Telnet data after a predetermined period of inactivity. The sending of only the Keep-Alive data in a chunk allows the connection to remain alive even during periods of inactivity. Line 258 represents the tunneling of the Telnet messages generated by either the host system or the Web client emulator. The Telnet messages generated by either the host system or the Web client emulator are written into the Telnet message field. Line 260 specifies the end of chunk indicator as specified in the HTTP/1.1 specification.

The connection between the Web client and the host system is terminated when the Web client closes the HTTP tunnel mechanism 128. The extension will also recognize when the host system has prematurely ended the session and will allow the Web server to close the HTTP tunnel.

Although the present embodiment utilizes an emulator that runs as a stand-alone program on the Web client, it will be appreciated that the functionality of the emulator and/or the HTTP tunnel mechanism may be incorporated into a browser. In another embodiment, the Web client may initiate a HEAD response/request before establishing a connection. The initiation of a HEAD response/request is necessary when a Web server needs authentication of the Web client access. The HEAD response provides the Web client with information about authentication that the Web client may incorporate into the post request and the subsequent chunked data.

As one skilled in the art will appreciate, Telnet has many variations such as TN5250, NVT, VT220, and TN3270. These and other proprietary protocols may be used without departing from the scope of this invention. Likewise, the host session may provide a terminal session such as a 5250 type terminal session, a NVT type terminal session, a VT220 type terminal session, and a 3270 type terminal session without departing from the scope of this invention. In addition, although the present embodiment included an IBM host system, it will be appreciated that other host systems, such as Hewlett-Packard and UNIX host systems may be used. Further, even though the embodiment shown provides a virtual session through the Internet, the Internet may be replaced with an Intranet, WAN, or other network using HTTP.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of connecting a client computer on the Internet to a host system, the method comprising:

connecting a Web server to the host system through an extension that communicates with the host system using a connection-oriented protocol;

connecting the client computer to the Web server using HTTP;

generating connection-oriented data at the host system and the client computer;

transmitting the connection-oriented data in a series of messages between the client computer and the Web server on a persistent connection, each message including a header and a data field for storing the connection-oriented data;

parsing the transmitted messages received at the Web server in the extension and forwarding the connection-oriented data to the host system; and parsing the transmitted messages received at the client computer by an HTTP tunnel mechanism and forwarding the connection-oriented data to an emulator;

wherein upon receipt of the message at the Web server, the Web server forwards the message to the extension before receiving the series of messages from the client computer; and interleaving at least one transmitted message from the Web client with at least one transmitted message from the Web server on the persistent connection.

2. A server for providing a persistent virtual session over HTTP, the server comprising:

a server software component operable to communicate via a persistent HTTP tunnel with a first endpoint of a connection-oriented session; and an extension operable to communicate with the server software component and a second endpoint of a connection-oriented session;

wherein upon a connect request from the first endpoint, the extension establishes a connection-oriented session with the second endpoint to provide a virtual connection-oriented session, after the virtual connection oriented session is established, the extension:

(a) receives one or more chunked client messages complying with an HTTP specification from a client, each chunked client message comprising a chunk header and a data portion;

(b) forwards the data portion to the second endpoint over the connection oriented session;

(c) receives one or more second endpoint messages from the second endpoint;

(d) encapsulates each second endpoint message into a chunked second endpoint message; and (e) forwards the chunked second endpoint message to the client that delivers the second endpoint message of the chunked second endpoint message to the first endpoint; and (f) interleaves at least one chunked client message with at least one chunked second endpoint message on the persistent virtual session.

3. The server of claim 2, wherein the first endpoint is a client application.

4. The server of claim 3, wherein the client application is a terminal emulator.

5. The server of claim 2, wherein the second endpoint is a host system.

6. A Web client having a first endpoint with a persistent virtual session with a second endpoint over HTTP, the Web client comprising:
  (a) an application for sending and receiving data messages complying with a connection-oriented session at the second endpoint; and
  (b) an HTTP tunnel mechanism for receiving the data messages generated by the application and inserting the data messages into a chunked data message complying with HTTP and transmitting the chunked data message to a Web server and for receiving chunked data messages generated by the Web server and forwarding the data message within the chunked data message to the application, wherein the chunked data message comprises a chunk header, at least one data message, and wherein the chunked data message is configured without an end chunk message, wherein the omission of the end chunk message preserves the persistent virtual session.

7. The Web client of claim 6, wherein the application is a terminal emulator.

8. The Web client of claim 6, wherein the second endpoint is a host system.

* * * * *

UNITED STATES PATENT AND TRADEMARK OFFICE
CERTIFICATE OF CORRECTION

PATENT NO. : 6,721,792 B2
DATED : April 13, 2004
INVENTOR(S) : R.D. Erickson et al.

It is certified that error appears in the above-identified patent and that said Letters Patent is hereby corrected as shown below:

<u>Title page,</u>
Insert Items:
-- [73]  Assignee: Wall Data Incorporated, Kirkland, WA (US) --; and
-- [74]  *Attorney, Agent, or Firm*–Christensen O'Connor Johnson Kindness PLLC --

Signed and Sealed this

Tenth Day of August, 2004

JON W. DUDAS
*Acting Director of the United States Patent and Trademark Office*